(12) United States Patent
Pang

(10) Patent No.: US 10,812,943 B1
(45) Date of Patent: Oct. 20, 2020

(54) METHOD AND DEVICE FOR SENSING TERMINAL ACTION

(71) Applicant: BEIJING XIAOMI MOBILE SOFTWARE CO., LTD., Beijing (CN)

(72) Inventor: Fangcheng Pang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/677,282

(22) Filed: Nov. 7, 2019

(30) Foreign Application Priority Data

May 24, 2019 (CN) .......................... 2019 1 0439394

(51) Int. Cl.
*H04W 24/00* (2009.01)
*H04W 4/029* (2018.01)
*H04W 4/02* (2018.01)
*H04W 88/02* (2009.01)

(52) U.S. Cl.
CPC ........... *H04W 4/029* (2018.02); *H04W 4/027* (2013.01); *H04W 88/02* (2013.01)

(58) Field of Classification Search
CPC ....... H04W 4/029; H04W 64/00; H04W 4/02; H04L 29/08657
See application file for complete search history.

(56) References Cited

U.S. PATENT DOCUMENTS

| | | | |
|---|---|---|---|
| 8,036,679 B1 * | 10/2011 | Barbeau | H04W 4/029 455/456.1 |
| 9,253,603 B1 * | 2/2016 | Dong | H04W 4/48 |
| 9,730,181 B1 | 8/2017 | Matsumoto | |
| 2010/0121716 A1 | 5/2010 | Golan | |
| 2011/0081634 A1 | 4/2011 | Kurata | |
| 2011/0171909 A1 * | 7/2011 | Jung | H04W 4/029 455/41.2 |
| 2012/0258734 A1 * | 10/2012 | Takahashi | H04M 1/72572 455/456.1 |
| 2013/0304685 A1 | 11/2013 | Kurata | |
| 2015/0193923 A1 * | 7/2015 | Soto | G06T 7/60 382/106 |

(Continued)

FOREIGN PATENT DOCUMENTS

| CN | 105392119 A | 3/2016 |
|---|---|---|
| CN | 106595647 A | 4/2017 |

(Continued)

OTHER PUBLICATIONS

European Search Report in the European application No. 19212119.2 dated Jun. 18, 2020.

(Continued)

*Primary Examiner* — Shantell L Heiber
(74) *Attorney, Agent, or Firm* — Syncoda LLC; Feng Ma

(57) ABSTRACT

A method of sensing a terminal action includes: location information of a terminal is acquired; a wireless communication connection is established between the terminal and an Access Point (AP); a motion action parameter of the terminal is determined according to the location information of the terminal; and an action pattern of the terminal is determined by matching the motion action parameter of the terminal with a pre-constructed action pattern model. The AP can sense changes in a location and status of a Station (STA) in real time to dynamically detect a motion action of the STA.

15 Claims, 10 Drawing Sheets

---

A first space coordinate of a terminal at a starting moment of a target time bucket and a second space coordinate at an ending moment of the target time bucket are acquired, the first space coordinate and the second space coordinate being space coordinates of the terminal in a three-dimensional coordinate system established by taking a preset location as an origin — 200

A motion action parameter of the terminal is determined according to the first space coordinate and the second space coordinate — 201

An action pattern of the terminal is determined by the motion action parameter of the terminal with a pre-constructed action pattern model — 102

(56) References Cited

U.S. PATENT DOCUMENTS

2015/0350822 A1   12/2015  Xiao et al.
2016/0236034 A1    8/2016  Sato
2016/0273929 A1*  9/2016  Zhang ................ G01C 21/3697
2019/0141490 A1    5/2019  Archer et al.

FOREIGN PATENT DOCUMENTS

| CN | 106931960 A | 7/2017 |
|---|---|---|
| CN | 107992227 A | 5/2018 |
| CN | 109059929 A | 12/2018 |
| CN | 109100537 A | 12/2018 |
| KR | 20110136671 A | 12/2011 |

OTHER PUBLICATIONS

First Office Action of the Chinese application No. 201910439394.3, dated Jun. 3, 2020.

\* cited by examiner

METHOD AND DEVICE FOR SENSING TERMINAL ACTION

CROSS-REFERENCE TO RELATED APPLICATION

This application claims priority to Chinese patent application No. 201910439394.3 filed on May 24, 2019, the disclosure of which is hereby incorporated by reference in its entirety.

BACKGROUND

Since a first-generation Wireless Local Area Network (WLAN) standard, i.e., an 802.11 protocol, was released by the Institute of Electrical and Electronic Engineers (IEEE) in 1997, WLAN technologies have been developed for about 20 years. A user may be connected with a terminal, which may also be called a Station (STA), through an Access Point (AP) in production and daily life to conduct various activities with the Internet.

SUMMARY

The present disclosure generally relates to the technical field of electronics, and more particularly, to a method and device for sensing a terminal action.

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of embodiments of the present disclosure, a method for sensing a terminal action is provided, which may include that:

location information of a terminal which has a wireless communication connection with an AP is acquired;

a motion action parameter of the terminal is determined according to the location information of the terminal; and an action pattern of the terminal is determined by matching the motion action parameter of the terminal with an action pattern model that is constructed in advance.

According to a second aspect of the embodiments of the present disclosure, a device for sensing a terminal action is provided, which may include:

a processor; and a memory configured to store an instruction executable by the processor, wherein the processor may be configured to execute steps of:

acquiring location information of a terminal which has a wireless communication connection with an Access Point (AP);

determining a motion action parameter of the terminal according to the location information of the terminal; and determining an action pattern of the terminal by matching the motion action parameter of the terminal with an action pattern model which is constructed in advance.

According to a third aspect of the embodiments of the present disclosure, a non-transitory computer-readable storage medium is provided, which has stored an instruction thereon, when executed by a processor, to enable the processor to execute the above method.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. "First" "second" and similar terms used in the specification and claims of the present application are not to represent any sequence, number or importance but only to distinguish different parts. Likewise, similar terms such as "a/an" and "the" also do not represent a number limit but represent "at least one". Terms like "include" or "comprise" refer to that an element or object appearing before "include" or "comprise" covers an element or object and equivalent thereof listed after "include" or "comprise" and does not exclude another element or object. It is also to be understood that term "and/or" used in the present disclosure refers to and includes one or any or all possible combinations of multiple associated items that are listed.

The embodiments of the present disclosure will be described below in combination with the accompanying drawings in detail. Characteristics in the following embodiments and implementation modes may be combined without conflicts.

Typically, an AP has a function of establishing wireless communication with a terminal only, which is non-diversified and cannot satisfy the diversified needs of a user.

Figure 1:
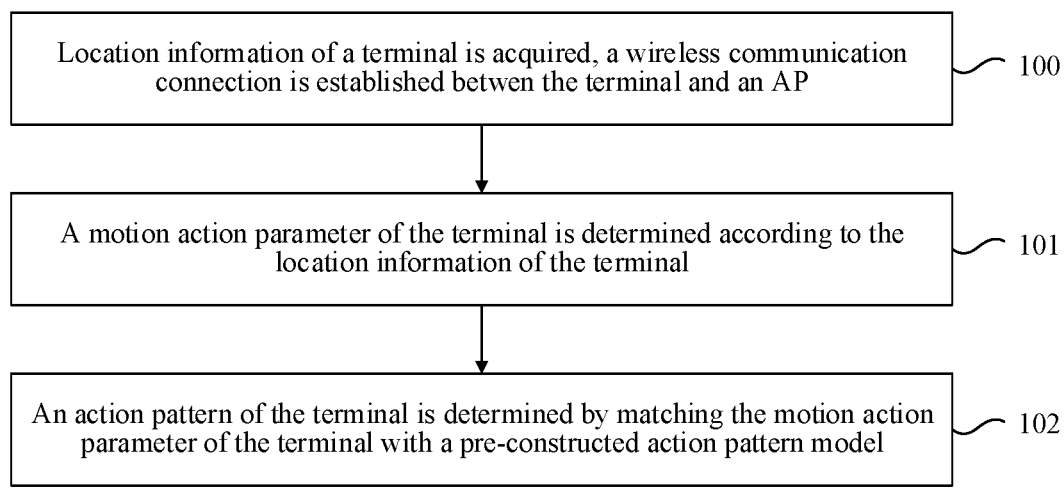
FIG. 1 is a flowchart illustrating a method for sensing a terminal action according to some embodiments.

FIG. 1 is a flowchart illustrating a method for sensing a terminal action according to some embodiments. As shown in FIG. 1, the method can include the following operations.

In operation 100, location information of a terminal is acquired, a wireless communication connection is established between the terminal and an AP.

In operation 101, a motion action parameter of the terminal is determined according to the location information of the terminal.

In operation 102, an action pattern of the terminal is determined by matching the motion action parameter of the terminal with a pre-constructed action pattern model.

In the embodiments of the present disclosure, a Wireless Local Area Network (WLAN) can be represented as a communication network for implementing communication connection by use of a Radio Frequency (RF) technology through an electromagnetic wave.

The Access Point (AP) can be represented as a device capable of providing wireless signal access in the WLAN. The AP can be configured to execute a routing function and a wireless signal transmission function, and the AP can also be configured to execute the wireless signal transmission function only. The type of the AP is not limited in the embodiments of the present disclosure.

The terminal can be represented as a wireless terminal device capable of establishing the wireless communication connection with the AP in the WLAN. The wireless terminal device can be configured with a wireless network card and establish the wireless communication connection with the AP through the wireless network card. The wireless terminal device can be, for example, a mobile phone, a smart watch, a pad, a notebook computer and a desktop computer. The type of the terminal is not limited in the embodiments of the present disclosure.

As an example of the embodiments, the AP can acquire the location information of the terminal under the wireless communication connection with the terminal. For example, the terminal can be provided with a global navigation satellite system, and geographic location information of the terminal can be obtained through the global navigation satellite system; and the AP can determine a motion distance (which is an example of the motion action parameter) of the terminal according to the geographic location information (which is an example of the location information) of the terminal. The action pattern model can be pre-constructed. For example, there can be several conditions for determining the action pattern model as follows: when the motion distance of the terminal is less than a distance threshold, it is determined that the terminal does not move (which is an example of the action pattern); and when the motion distance of the terminal is more than or equal to the distance threshold, it is determined that the terminal moves (which is any other example of the action pattern). The AP can match the motion action parameter of the terminal with the pre-constructed action pattern model and determine an action pattern obtained by the matching as the action pattern of the terminal.

According to the embodiments of the present disclosure, the location information of the terminal which has the wireless communication connection with the AP is acquired, the motion action parameter of the terminal is determined according to the location information of the terminal, and the action pattern of the terminal is determined by matching the motion action parameter of the terminal with the pre-constructed action pattern model, so that the AP can sense changes in a location and status of the terminal in real time to dynamically detect a motion action of the terminal.

In a possible implementation mode, the AP can acquire the location information of the terminal in a target time bucket and accordingly determine the action pattern of the terminal in the target time bucket. The target time bucket can be any period when the action pattern of the terminal is needed to be determined. For example, the AP can periodically determine the action pattern of the terminal. Each period can be determined as the target time bucket. A specified duration before a present moment can also be determined as the target time bucket. Or, the target time bucket can be preset in any proper manner according to a requirement. In any other possible implementation mode, the AP can determine the action pattern of the terminal according to a real-time change in the location information of the terminal.

Figure 2A:
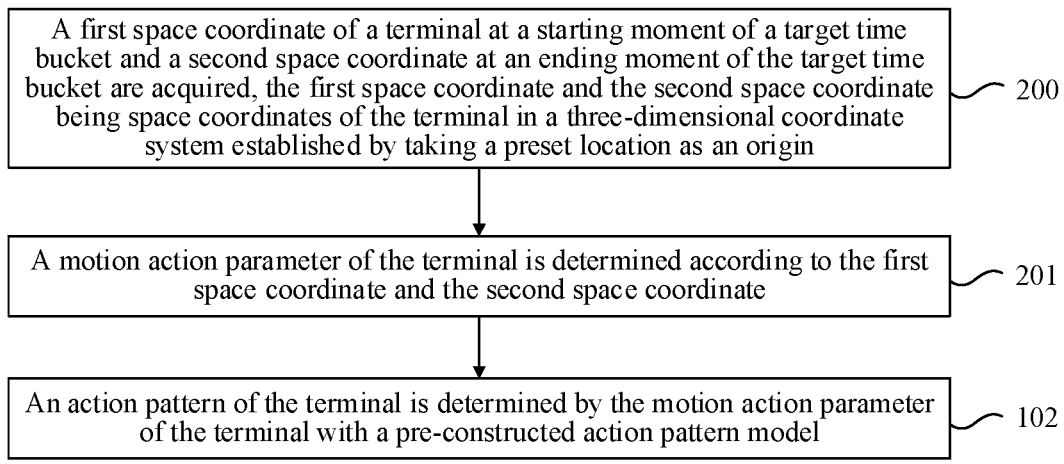
FIG. 2A is a flowchart illustrating a method for sensing a terminal action according to some embodiments.

FIG. 2A is a flowchart illustrating a method for sensing a terminal action according to some embodiments. As shown in FIG. 2A, the difference between FIG. 2A and FIG. 1 is as below.

The operation 100 can include an operation 200 that, a first space coordinate of the terminal at a starting moment of a target time bucket and a second space coordinate at an ending moment of the target time bucket are acquired, the first space coordinate and the second space coordinate being space coordinates of the terminal in a three-dimensional coordinate system established by taking a preset location as an origin.

The operation 101 can include an operation 201 that, the motion action parameter of the terminal is determined according to the first space coordinate and the second space coordinate.

For example, the AP can establish the three-dimensional coordinate system which takes the preset location as the origin (for example, the AP is the origin) (it is to be noted that a proper method can be adopted to establish a three-dimensional coordinate system which takes the AP as an origin or a three-dimensional coordinate system which takes any other reference as an origin, and the manner of establishing a three-dimensional coordinate system is not limited in the embodiments of the present disclosure). The AP can acquire the first space coordinate of the terminal in the three-dimensional coordinate system at the starting moment of the target time bucket and acquire the second space coordinate of the terminal in the three-dimensional coordinate system at the ending moment of the target time bucket and can determine the motion action parameter of the terminal in the target time bucket according to the first space coordinate and the second space coordinate.

Figure 2B:
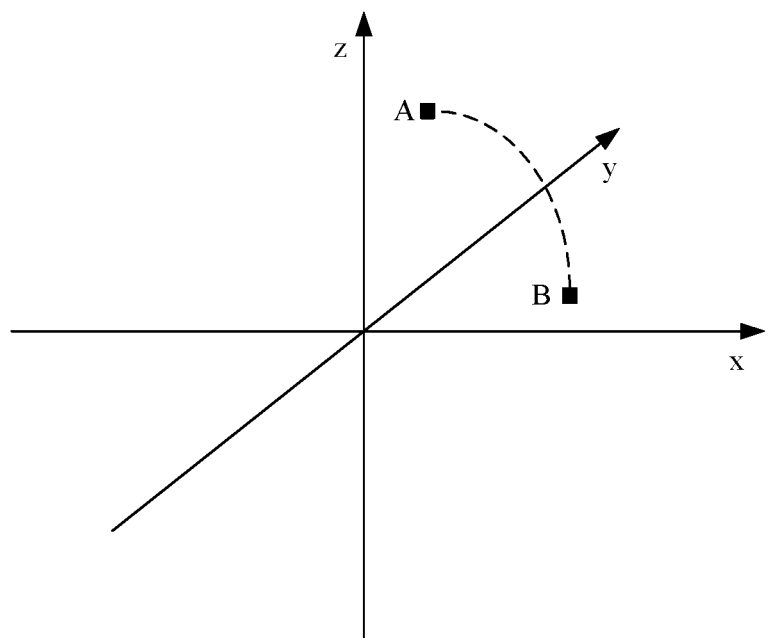
FIG. 2B is a schematic diagram illustrating a three-dimensional coordinate system which takes an AP as an origin according to an example.

For example, FIG. 2B is a schematic diagram illustrating a three-dimensional coordinate system which takes an AP as an origin according to an example. As shown in FIG. 2B, the terminal can be located at a point A in the three-dimensional coordinate system at the starting moment of the target time bucket; the first space coordinate of the terminal, acquired by the AP at the starting moment of the target time bucket, can be $A(x_a, y_a, z_a)$; the terminal can be located at a point B in the three-dimensional coordinate system at the ending moment of the target time bucket; and the second space coordinate of the terminal, acquired by the AP at the ending moment of the target time bucket, can be $B(x_b, y_b, z_b)$. In such a case, the motion action parameter of the terminal in the target time bucket is determined according to $A(x_a, y_a, z_a)$ and $B(x_b, y_b, z_b)$.

Figure 3:
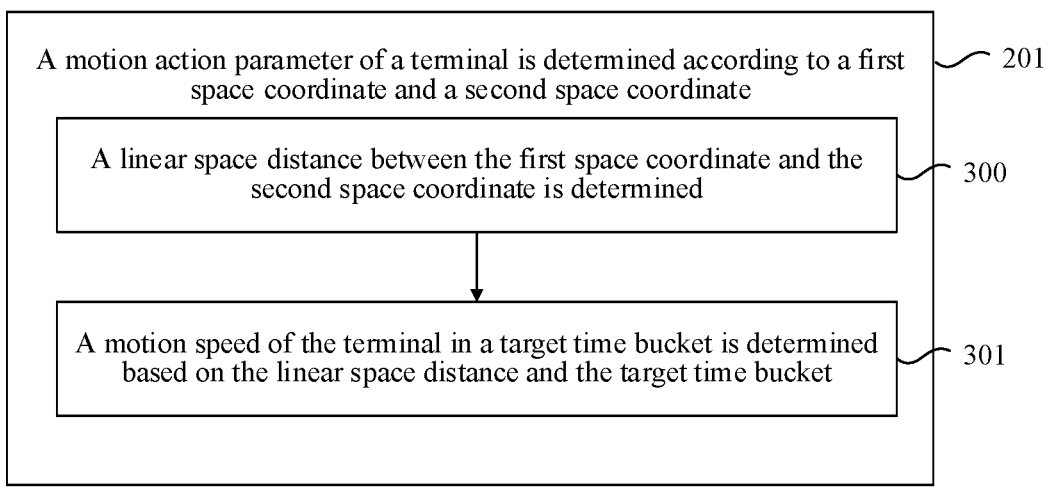
FIG. 3 is a flowchart illustrating operation 201 in a method for sensing a terminal action according to some embodiments.

FIG. 3 is a flowchart illustrating operation 201 in a method for sensing a terminal action according to some embodiments. The motion action parameter can include a motion speed of the terminal. As shown in FIG. 3, the operation 201 can include the following operations.

In an operation 300, a linear space distance between the first space coordinate and the second space coordinate is determined.

In an operation 301, the motion speed of the terminal in the target time bucket is determined based on the linear space distance and the target time bucket.

For example, as shown in FIG. 2B, the terminal can be located at the point A in the three-dimensional coordinate system at the starting moment of the target time bucket, and thus, the first space coordinate of the terminal, acquired by the AP at the starting moment of the target time bucket, can be $A(x_a,y_a,z_a)$; the terminal can be located at the point B in the three-dimensional coordinate system at the ending moment of the target time bucket, and thus, the second space coordinate of the terminal, acquired by the AP at the ending moment of the target time bucket, can be $B(x_b,y_b,z_b)$. In such a case, a distance L between A and B can be determined according to a formula $\sqrt{L=(x_a-x_b)^2+(y_a-y_b)^2+(z_a-z_a)^2}$, the distance L can be determined as a motion distance of the terminal in the target time bucket, and if a duration of the target time bucket is T, an average speed V of the terminal in the target time bucket can be determined according to a formula $$V = \frac{L}{T}.$$

Figure 4:
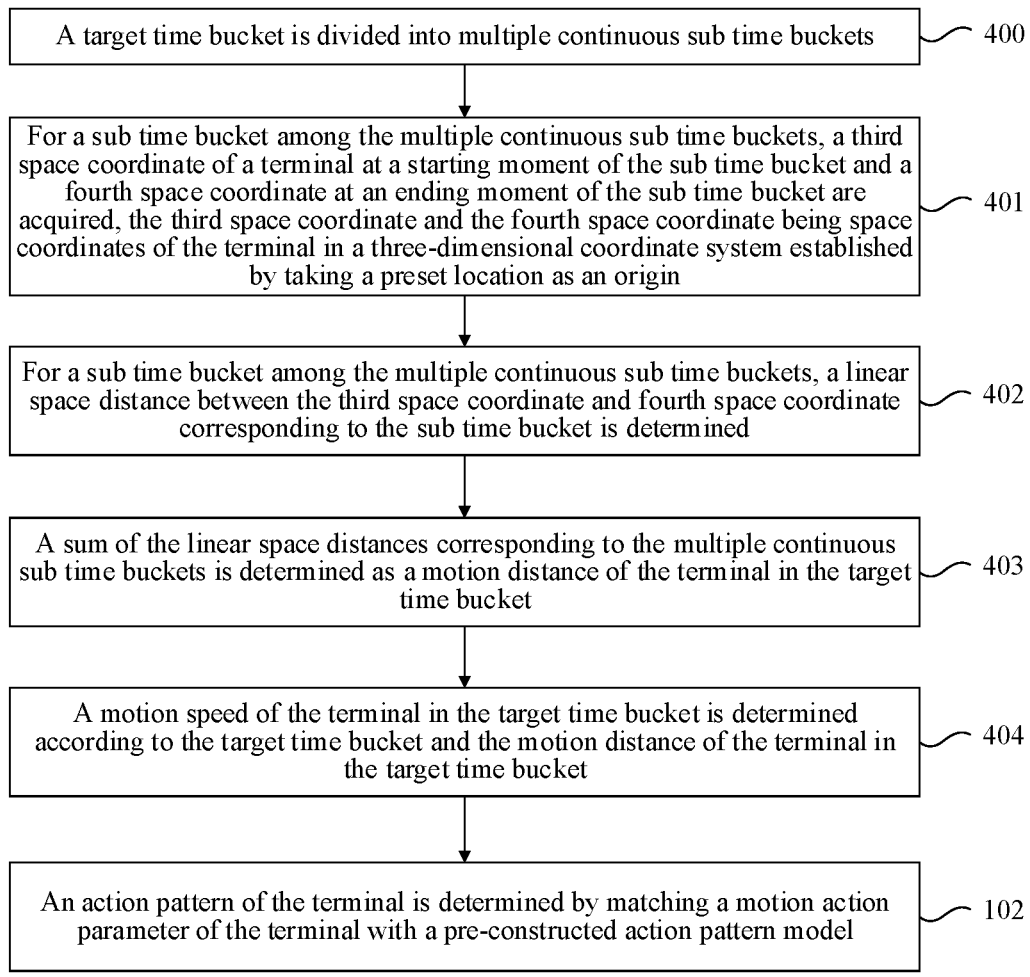
FIG. 4 is a flowchart illustrating a method for sensing a terminal action according to some embodiments.

FIG. 4 is a flowchart illustrating a method for sensing a terminal action according to some embodiments. The motion action parameter includes the motion speed of the terminal. As shown in FIG. 4, the difference between FIG. 4 and FIG. 1 is that the operations 100 and 101 can further include the following operations.

In an operation 400, the target time bucket is divided into multiple continuous sub time buckets.

In an operation 401, for a sub time bucket among the multiple continuous sub time buckets, a third space coordinate of the terminal at a starting moment of the sub time bucket and a fourth space coordinate at an ending moment of the sub time bucket are acquired; the third space coordinate and the fourth space coordinate are space coordinates of the terminal in the three-dimensional coordinate system established by taking the preset location as the origin.

The operation 101 can include the following operations.

In an operation 402, for a sub time bucket among the multiple continuous sub time buckets, a linear space distance between the third space coordinate and fourth space coordinate corresponding to the sub time bucket is determined.

In an operation 403, a sum of the linear space distances corresponding to a sub time bucket among the multiple continuous sub time buckets is determined as a motion distance of the terminal in the target time bucket.

In an operation 404, the motion speed of the terminal in the target time bucket is determined according to the target time bucket and the motion distance of the terminal in the target time bucket.

For example, for improving the accuracy of calculation, the target time bucket can include multiple continuous sub time buckets with a same duration (for example, t can be equally divided into n parts, namely the time bucket t is equally divided into n moments $t_0, t_1 \ldots t_n$; if the greater n is, the difference between that calculated distance and an actual motion distance of the terminal is smaller). For a sub time bucket among the multiple continuous sub time buckets, the third space coordinate of the terminal at a location of the starting moment of the sub time bucket can be acquired, the fourth space coordinate of the terminal at a location of the ending moment of the sub time bucket can be acquired, and the motion distance of the terminal in the sub time bucket can be determined according to the third space coordinate and fourth space coordinate corresponding to a sub time bucket among the multiple continuous sub time buckets. The sum of the motion distances of the terminal in all the sub time buckets can be determined as the motion distance of the terminal in the target time bucket, and a quotient of the motion distance of the terminal in the target time bucket divided by the target time bucket can be determined as the average speed of the terminal in the target time bucket.

The terminal may not always straightly move in the target time bucket and is very likely to reciprocate, therefore, determining a linear motion distance of the terminal in a sub time bucket among the multiple continuous sub time buckets of the target time bucket can make the finally determined motion distance of the terminal in the target time bucket closer to the actual motion distance of the terminal, which is favorable for obtaining the average speed of the terminal more accurately.

Figure 5:
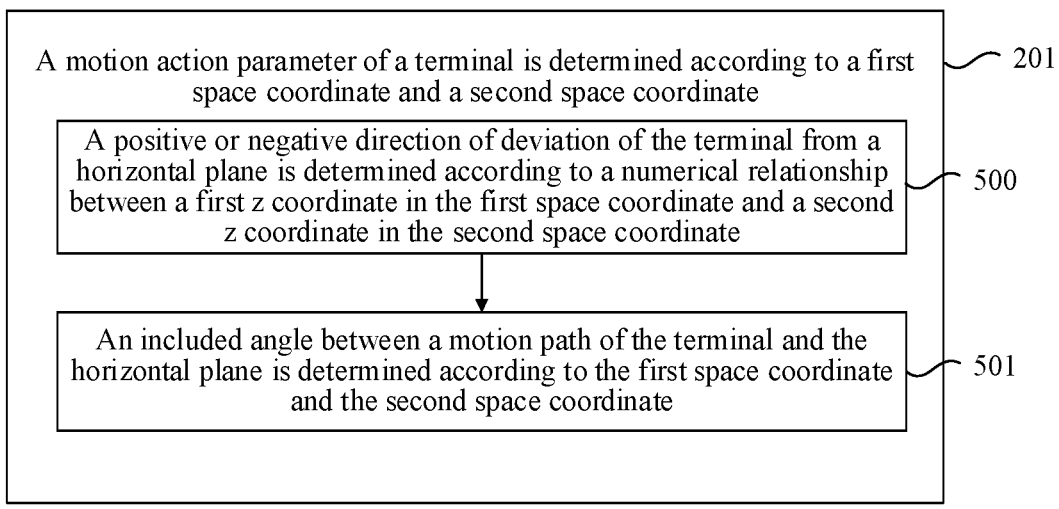
FIG. 5 is a flowchart illustrating operation 201 in a method for sensing a terminal action according to some embodiments.

FIG. 5 is a flowchart illustrating operation 201 in a method for sensing a terminal action according to some embodiments. The motion action parameter includes a degree of deviation of the terminal from a horizontal plane. As shown in FIG. 5, the operation 201 can include the following operations.

In an operation 500, a positive or negative direction of deviation of the terminal from the horizontal plane is determined according to a numerical relationship between a first z coordinate in the first space coordinate and a second z coordinate in the second space coordinate.

In an operation 501, an included angle between a motion path of the terminal and the horizontal plane is determined according to the first space coordinate and the second space coordinate.

It is to be noted that the operation 501 can be executed after the operation 500, or the operation 501 can also be executed before operation 500. An execution sequence of the operation 501 and the operation 500 is not limited in the embodiments of the present disclosure.

For example, the degree of deviation of the terminal from the horizontal plane can include a positive or negative direction of deviation of the terminal from the horizontal plane. As shown in FIG. 2B, the terminal can be located at the point A in the three-dimensional coordinate system at the starting moment of the target time bucket, the first space coordinate of the terminal, acquired by the AP at the starting moment of the target time bucket, can be $A(x_a,y_a,z_a)$; the terminal can be located at the point B in the three-dimensional coordinate system at the ending moment of the target time bucket, and the second space coordinate of the terminal, acquired by the AP at the ending moment of the target time bucket, can be $B(x_b,y_b,z_b)$. In such a case, the positive or negative direction of deviation of the terminal from the horizontal plane in the target time bucket can be determined according to a symbol of a difference between $z_b$ and $z_a$. If the symbol of the difference between $z_b$ and $z_a$ is positive, it can be determined that deviation of the terminal from the horizontal plane in the target time bucket is upward motion (which is an example of the positive direction of deviation from the horizontal plane); and if the symbol of the difference between $z_b$ and $z_a$ is negative, it can be determined that deviation of the terminal from the horizontal plane in the target time bucket is downward motion (which is an example of the negative direction of deviation from the horizontal plane).

In the above example, the degree of deviation from the horizontal plane can further include the included angle between the motion path of the terminal and the horizontal plane, and an included angle β (which is an example of a motion inclination angle) between the motion path of the terminal in the target time bucket and the horizontal plane (i.e., a plane formed by an axis x and an axis y) in the three-dimensional coordinate system can be determined according to a formula $$\beta = \arctan\left(\frac{|z_a - z_b|}{\sqrt{(x_a - x_b)^2 + (y_a - y_b)^2}}\right).$$

Figure 6:
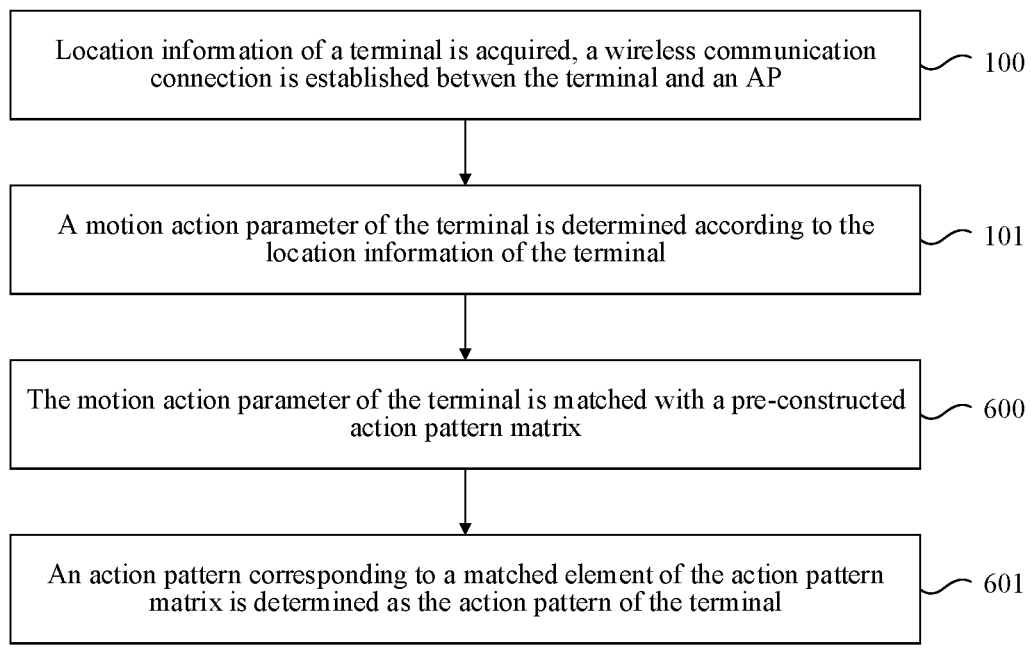
FIG. 6 is a flowchart illustrating a method for sensing a terminal action according to some embodiments.

FIG. 6 is a flowchart illustrating a method for sensing a terminal action according to some embodiments.

In a possible implementation mode, the action pattern model can include an action pattern matrix; and different columns of the action pattern matrix represent different degree intervals of deviation of the terminal from the horizontal plane; different rows represent different motion speed intervals of the terminal; and an element of the action pattern matrix represents an action pattern determined by both a motion speed interval corresponding to the row where the element is located and a degree interval, corresponding to the column where the element is located, of deviation from the horizontal plane. Or, different rows of the action pattern matrix represent different degree intervals of deviation of the terminal from the horizontal plane; different columns represent different motion speed intervals of the terminal; and an element of the action pattern matrix represents an action pattern determined by both a motion speed interval corresponding to the column where the element is located and a degree interval, corresponding to the row where the element is located, of deviation from the horizontal plane.

As shown in FIG. 6, the difference between FIG. 6 and FIG. 1 is that the operation 102 can include the following operations.

In operation 600, the motion action parameter of the terminal is taken to match with a pre-constructed action pattern matrix.

In operation 601, an action pattern corresponding to a matched element of the action pattern matrix is determined as the action pattern of the terminal.

In the above example, for the average speed of the terminal in the target time bucket, speed thresholds $V_0$ and $V_1$ may be preset, moreover, $0<V_0<V_1$. In such a case, the motion speed interval can include any one or more of the following situations:

A motion speed interval a1 can be V=0; and an action pattern determined by a1 can be that the terminal does not move;

A motion speed interval a2 can be $0<V<V_0$; and an action pattern determined by a2 can be that the terminal moves at a low speed;

A motion speed interval a3 can be $V_0 \leq V < V_1$; and an action pattern determined by a3 can be that the terminal moves at an intermediate speed; and A motion speed interval a4 can be $V \geq V_1$; and an action pattern determined by a4 can be that the terminal moves at a high speed.

In a possible implementation mode, the degree interval of deviation from the horizontal plane can include a motion inclination angle interval and a motion direction of deviation of the terminal from the horizontal plane.

In the above example, for the motion inclination angle of the terminal in the target time bucket, it can be set that a minimum value of the motion inclination angle β is 0° and a maximum value is 90°, and angle thresholds can be set to be $0° \leq \beta_0 < \beta_1 \leq 90°$. In such a case, the degree interval of deviation from the horizontal plane can include any one or more of the following situations:

A degree interval b1 of deviation from the horizontal plane can be β=0° and $z_a = z_b$; and an action pattern determined by b1 can be that the terminal does not move or the terminal moves along a horizontal direction;

A degree interval b2 of deviation from the horizontal plane can be $0° < \beta \leq \beta_0$ and $z_a < z_b$; and an action pattern determined by b2 can be that a degree of deviation of the motion direction of the terminal from the horizontal plane is low and the motion direction is upward;

A degree interval b3 of deviation from the horizontal plane can be $0° < \beta \leq \beta_0$ and $z_a > z_b$; and an action pattern determined by b3 can be that a degree of deviation of the motion direction of the terminal from the horizontal plane is low and the motion direction is downward;

A degree interval b4 of deviation from the horizontal plane can be $\beta_0 \leq \beta < \beta_1$ and $z_a < z_b$; and an action pattern determined by b4 can be that a degree of deviation of the motion direction of the terminal from the horizontal plane is intermediate and the motion direction is upward;

A degree interval b5 of deviation from the horizontal plane can be $\beta_0 \leq \beta < \beta_1$ and $z_a > z_b$; and an action pattern determined by b5 can be that a degree of deviation of the motion direction of the terminal from the horizontal plane is intermediate and the motion direction is downward;

A degree interval b6 of deviation from the horizontal plane can be $\beta_1 \leq \beta \leq 90°$ and $z_a < z_b$; and an action pattern determined by b6 can be that a degree of deviation of the motion direction of the terminal from the horizontal plane is high and the motion direction is upward; and A degree interval b7 of deviation from the horizontal plane can be $\beta_1 \leq \beta \leq 90°$ and $z_a > z_b$; and an action pattern determined by b7 can be that a degree of deviation of the motion direction of the terminal from the horizontal plane is high and the motion direction is downward.

Table 1 is the action pattern matrix shown in the example. An element of the action pattern matrix can represent an action pattern determined by a motion speed interval corresponding to the row where the element is located and an action pattern determined by the motion inclination angle corresponding to the column where the element is located and the positive or negative direction of deviation of the terminal from the horizontal plane. For example, as shown in Table 1, element s00 can represent that the terminal does not move; and element s63 can represent that the terminal moves at a high speed and that the degree of deviation of the motion direction from the horizontal direction is high and the motion direction is downward, which can indicate that the terminal is dropping. It is to be noted that, since the terminal does not deviate when not moving, all elements s10, s20, s30, s40, s50 and s60 can be set to represent invalid judgment.

TABLE 1

|    | a1  | a2  | a3  | a4  |
|----|-----|-----|-----|-----|
| b1 | s00 | s01 | s02 | s03 |
| b2 | s10 | s11 | s12 | s13 |
| b3 | s20 | s21 | s22 | s23 |
| b4 | s30 | s31 | s32 | s33 |
| b5 | s40 | s41 | s42 | s43 |
| b6 | s50 | s51 | s52 | s53 |
| b7 | s60 | s61 | s62 | s63 |

It is to be noted that the speed thresholds or the number of the speed thresholds and the motion inclination angle thresholds or the number of the motion inclination angle thresholds can be set according to, for example, an empirical value. Specific numerical values and amounts of the speed thresholds and the motion inclination angle thresholds are not limited in the embodiments of the present disclosure.

Other preset conditions and action patterns corresponding to the preset conditions, for example, an acceleration threshold, can also be selected according to a requirement. There are no limits made thereto in the embodiments of the present disclosure.

In addition, the action pattern model can be constructed by the AP, or it can also be constructed by the terminal or a server and a result thereof is sent to the AP. There are no limits made herein.

In a possible implementation mode, the method can further include that:

prompting information is sent to the terminal and/or any other terminal which establishes a wireless communication connection with the AP in a preset prompting manner. The prompting information is for indicating the determined action pattern of the terminal.

In the above example, if the AP determines the action pattern of the terminal in the target time bucket, indication information used for indicating the action pattern can be sent to the terminal to control the terminal to display the action pattern indicated by the indication information, which is favorable for timely prompting the action pattern of the terminal to a user holding the terminal.

In a possible implementation mode, the AP, when determining the action pattern of the terminal, can send the indication information used for indicating the action pattern of the terminal to any other terminal which establishes a wireless communication connection with the AP to notify the action pattern of the terminal to the any other terminal in the WLAN in real time.

In a possible implementation mode, the AP, when determining the action pattern of the terminal, can send the indication information used for indicating the action pattern or action nature of the terminal to any other terminal which establishes the wireless communication connection with the AP and has an association relationship with the terminal to pertinently notify the action pattern of the terminal to the any other terminal in real time.

In a possible implementation mode, the method can be applied to the AP. The method can also be applied to an electronic device capable of establishing a communication connection with the AP, and the electronic device can establish a wireless communication connection or a wired communication connection with the AP. The type of the communication connection established between the electronic device and the AP is not limited in the embodiments of the present disclosure. The electronic device can be, for example, a mobile phone, a pad or a desktop computer. The type of the electronic device is not limited in the embodiments of the present disclosure.

In an application example, the following descriptions are made under the condition that the terminal is a mobile phone as an example.

The AP, after establishing a WLAN communication connection with the mobile phone, can acquire a first space coordinate of the mobile phone and can acquire a second space coordinate of the mobile phone 30 seconds (which is an example of the target time bucket) later. The AP can determine a linear motion distance L of the mobile phone in the 30 seconds according to the first space coordinate and the second space coordinate, and can further determine a motion speed of the mobile phone in the 30 seconds according to the linear distance L and the 30 seconds. The AP can further determine a motion path of the mobile phone in the target time bucket and a motion inclination angle relative to the horizontal plane in the three-dimensional coordinate system. The AP can preset an action pattern matrix. Different columns of the action pattern matrix can represent different degree intervals of deviation of the terminal from the horizontal plane, different rows can represent different motion speed intervals of the terminal, and an element of the action pattern matrix can represent an action pattern determined by a motion speed interval corresponding to the row where the element is located, a motion inclination angle interval corresponding to the column where the element is located and a positive or negative direction of deviation of the terminal from the horizontal plane. A speed and a motion inclination angle of the terminal and the positive or negative direction of deviation of the terminal from the horizontal plane can be taken to match with the action pattern matrix. The AP can determine an action pattern corresponding to a matched element of the action pattern matrix as an action pattern of the terminal. The AP can further send prompting information used for indicating the action pattern of the mobile phone to the mobile phone.

Figure 7:
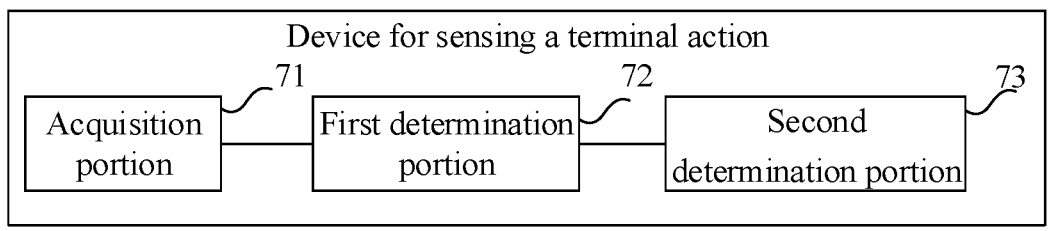
FIG. 7 is a block diagram of a device for sensing a terminal action according to some embodiments.

FIG. 7 is a block diagram of a device for sensing a terminal action according to some embodiments. As shown in FIG. 7, the device can include:

an acquisition portion 71, configured to acquire location information of a terminal which has a wireless communication connection with an AP;

a first determination portion 72, configured to determine a motion action parameter of the terminal according to the location information of the terminal; and a second determination portion 73, configured to determine an action pattern of the terminal by matching the motion action parameter of the terminal with a pre-constructed action pattern model.

Figure 8:
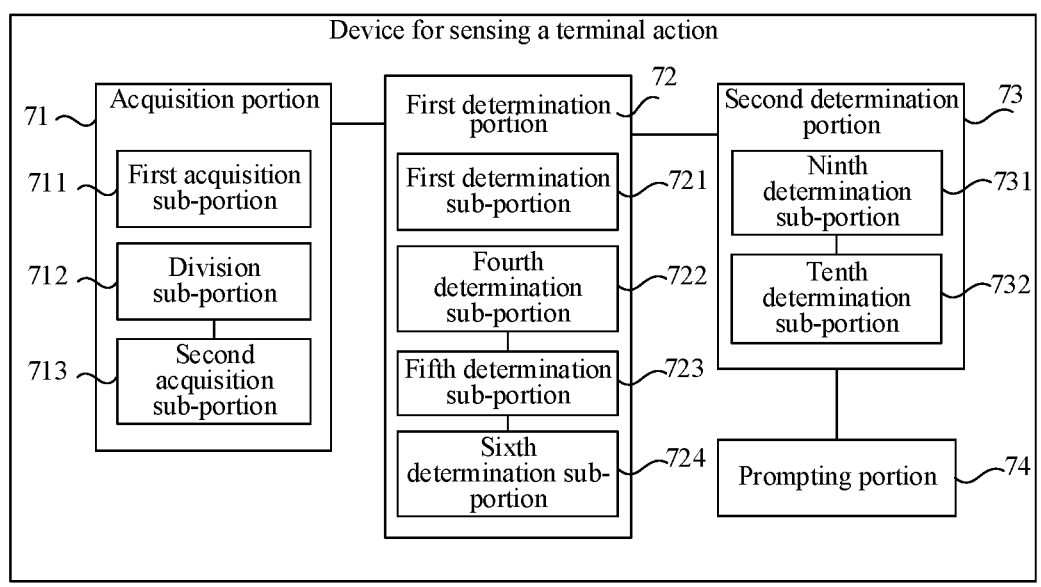
FIG. 8 is a block diagram of a device for sensing a terminal action according to some embodiments.

FIG. 8 is a block diagram of a device for sensing a terminal action according to some embodiments. For convenient description, only the parts related to these embodiments are shown in FIG. 8. The components in FIG. 8 with the same reference numbers as the components in FIG. 7 have the same functions as those components in FIG. 7. For simplicity, detailed descriptions about these components are not repeated.

As shown in FIG. 8, in a possible implementation mode, the acquisition portion 71 can include:

a first acquisition sub-portion 711, configured to acquire a first space coordinate of the terminal at a starting moment of a target time bucket and a second space coordinate at an ending moment of the target time bucket, the first space coordinate and the second space coordinate being space coordinates of the terminal in a three-dimensional coordinate system established by taking a preset location as an origin; and the first determination portion 72 can include:

a first determination sub-portion 721, configured to determine a motion action parameter of the terminal according to the first space coordinate and the second space coordinate.

In a possible implementation mode, the motion action parameter can include a motion speed of the terminal; and the first determination sub-portion 721 can include:

a second determination sub-portion, configured to determine a linear space distance between the first space coordinate and the second space coordinate, and a third determination sub-portion, configured to determine the motion speed of the terminal in the target time bucket based on the linear space distance and the target time bucket.

In a possible implementation mode, the motion action parameter can include a motion speed of the terminal;

the acquisition portion 71 can include:

a division sub-portion 712, configured to divide the target time bucket into multiple continuous sub time buckets, and a second acquisition sub-portion 713, configured to, for a sub time bucket among the multiple continuous sub time buckets, acquire a third space coordinate of the terminal at a starting moment of the sub time bucket and a fourth space coordinate at an ending moment of the sub time bucket, the third space coordinate and the fourth space coordinate being space coordinates of the terminal in the three-dimensional coordinate system established by taking the preset location as the origin; and the first determination portion 72 includes:

a fourth determination sub-portion 722, configured to, for a sub time bucket among the multiple continuous sub time buckets, determine a linear space distance between the third space coordinate and fourth space coordinate corresponding to the sub time bucket, a fifth determination sub-portion 723, configured to determine a sum of the linear space distances corresponding to the multiple continuous sub time buckets as a motion distance of the terminal in the target time bucket, and a sixth determination sub-portion 724, configured to determine the motion speed of the terminal in the target time bucket according to the target time bucket and the motion distance of the terminal in the target time bucket.

In a possible implementation mode, the motion action parameter can include a degree of deviation of the terminal from a horizontal plane; and the first determination sub-portion 721 can include:

a seventh determination sub-portion, configured to determine a positive or negative direction of deviation of the terminal from the horizontal plane according to a numerical relationship between a first z coordinate in the first space coordinate and a second z coordinate in the second space coordinate, and an eighth determination sub-portion, configured to determine an included angle between a motion path of the terminal and the horizontal plane according to the first space coordinate and the second space coordinate.

In a possible implementation mode, the action pattern model can include an action pattern matrix; different columns of the action pattern matrix represent different degree intervals of deviation of the terminal from the horizontal plane, different rows represent different motion speed intervals of the terminal, and an element of the action pattern matrix represents an action pattern determined by both a motion speed interval corresponding to the row where the element is located and a degree interval, corresponding to the column where the element is located, of deviation from the horizontal plane, or different rows of the action pattern matrix represent different degree intervals of deviation of the terminal from the horizontal plane, different columns represent different motion speed intervals of the terminal, and an element of the action pattern matrix represents an action pattern determined by both a motion speed interval corresponding to the column where the element is located and a degree interval, corresponding to the row where the element is located, of deviation from the horizontal plane; and the second determination portion 73 can include:

a ninth determination sub-portion 731, configured to take the motion action parameter of the terminal to match with a pre-constructed action pattern matrix, and a tenth determination sub-portion 732, configured to determine an action pattern corresponding to a matched element of the action pattern matrix as the action pattern of the terminal.

In a possible implementation mode, the device further can include:

a prompting portion 74, configured to send, in a preset prompting manner, prompting information to the terminal and/or any other terminal which establishes a wireless communication connection with the AP, the prompting information being used for indicating the determined action pattern of the terminal.

According to the embodiments of the present disclosure, the location information of the terminal which establishes the wireless communication connection with the AP is acquired, the motion action parameter of the terminal is determined according to the location information of the terminal, and the motion action parameter of the terminal is taken to match with the pre-constructed action pattern model to determine the action pattern of the terminal, so that the AP can sense changes in a location and status of the terminal in real time to dynamically detect a motion action of the terminal.

The operations of individual portions of the device have been described in detail in the embodiments of the method, which will not be elaborated herein.

Figure 9:
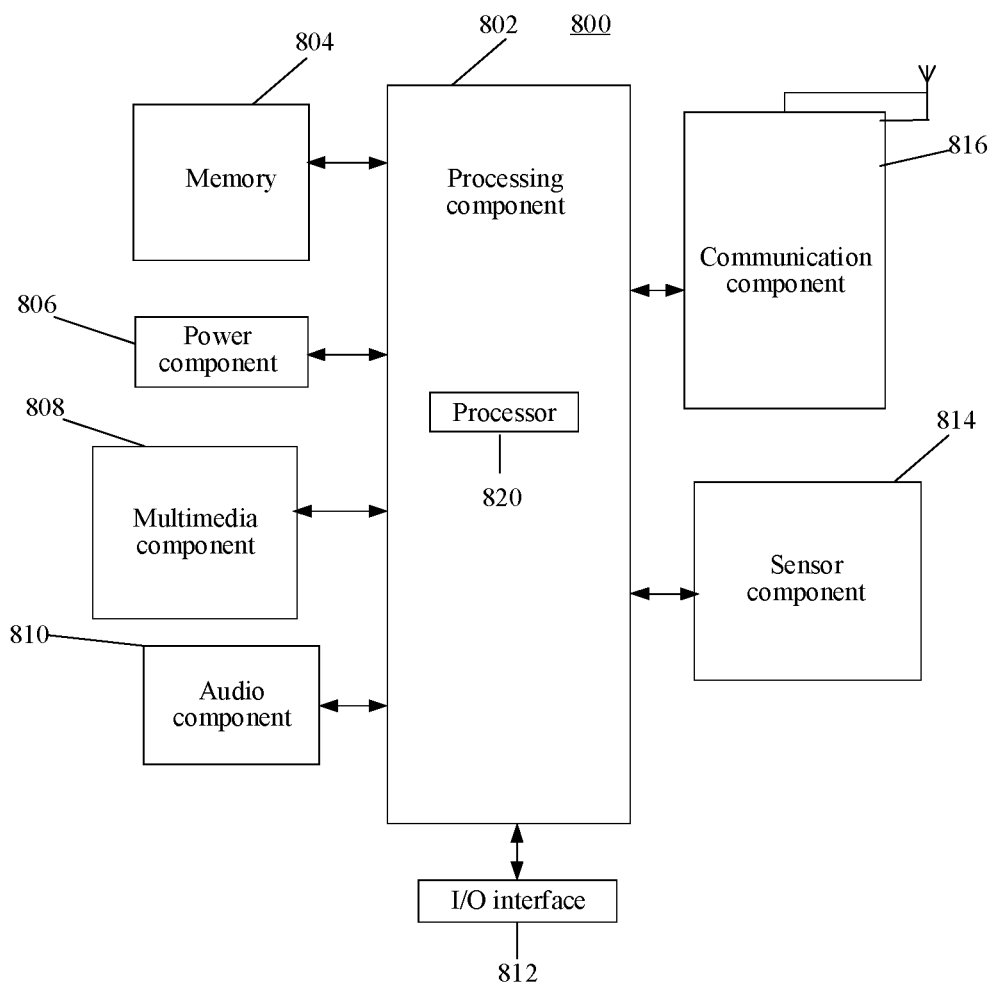
FIG. 9 is a block diagram of a device for sensing a terminal action according to some embodiments.

FIG. 9 is a block diagram of a device for sensing a terminal action according to some embodiments. For example, the device 800 can be a mobile phone, a computer, a digital broadcast terminal, a messaging device, a gaming console, a tablet, a medical device, exercise equipment, a personal digital assistant and the like.

Referring to FIG. 9, the device 800 can include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 can include one or more processors 820 to execute instructions to perform all or part of the operations in the above method. Moreover, the processing component 802 can include one or more portions which facilitate interaction between the processing component 802 and the other components. For instance, the processing component 802 can include a multimedia portion to facilitate interaction between the multimedia component 808 and the processing component 802.

The various device components, units, blocks, or portions may have modular configurations, or are composed of discrete components, but nonetheless can be referred to as "portions" in general. In other words, the "components," "modules," "blocks," "portions," or "units" referred to herein may or may not be in modular forms.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 may include a screen for providing an output interface between the device 800 and a user. In some examples, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some examples, the audio component 810 further includes a speaker configured to output the audio signal.

The I/O interface 812 is configured to provide an interface between the processing component 802 and a peripheral interface portion, and the peripheral interface portion may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a location of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some examples, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments, the communication component 816 receives a broadcast signal or broadcast associated information from an external broadcast management system through a broadcast channel. In some embodiments, the communication component 816 further includes a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and any other technology.

In some embodiments, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium having stored an instruction thereon, such as the memory 804 including an instruction, and the instruction may be executed by the processor 820 of the device 800 to implement the above method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

A non-transitory computer-readable storage medium can have instructions stored thereon, which executable by a processor of a terminal to enable the terminal to execute the methods of the embodiments described above.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as some only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for sensing a terminal action, comprising:
   acquiring location information of a terminal that has a wireless communication connection with an Access Point (AP);
   determining a motion action parameter of the terminal according to the location information of the terminal; and
   determining an action pattern of the terminal by matching the motion action parameter of the terminal with an action pattern model that is constructed in advance;
   wherein the acquiring the location information of the terminal comprises:
      acquiring a first space coordinate of the terminal at a starting moment of a target time bucket and a second space coordinate at an ending moment of the target time bucket, wherein the first space coordinate and the second space coordinate are space coordinates of the terminal in a three-dimensional coordinate system established by taking a preset location as an origin; and
   the determining the motion action parameter of the terminal according to the location information of the terminal comprises:
      determining the motion action parameter of the terminal according to the first space coordinate and the second space coordinate;
      wherein the motion action parameter comprises a degree of deviation of the terminal from a horizontal plane; and the determining the degree of deviation of the terminal from the horizontal plane according to the first space coordinate and the second space coordinate comprises:
         determining a positive or negative direction of deviation of the terminal from the horizontal plane according to a numerical relationship between a first z coordinate in the first space coordinate and a second z coordinate in the second space coordinate, and
         determining an included angle between a motion path of the terminal and the horizontal plane according to the first space coordinate and the second space coordinate.

2. The method of claim 1, wherein the motion action parameter comprises a motion speed of the terminal; and
   the determining the motion speed of the terminal according to the first space coordinate and the second space coordinate comprises:
      determining a linear space distance between the first space coordinate and the second space coordinate, and
      determining the motion speed of the terminal in the target time bucket based on the linear space distance and the target time bucket.

3. The method of claim 1, wherein the motion action parameter comprises a motion speed of the terminal;
   the acquiring the location information of the terminal comprises:
      dividing a target time bucket into multiple continuous sub time buckets; and
      for a sub time bucket among the multiple continuous sub time buckets, acquiring a third space coordinate of the terminal at a starting moment of the sub time bucket and a fourth space coordinate at an ending moment of the sub time bucket, wherein the third space coordinate and the fourth space coordinate are space coordinates of the terminal in a three-dimensional coordinate system established by taking a preset location as an origin; and the determining the motion speed of the terminal according to the location information of the terminal comprises:
for a sub time bucket among the multiple continuous sub time buckets, determining a linear space distance between the third space coordinate and fourth space coordinate corresponding to the sub time bucket,
determining a sum of the linear space distances corresponding to the multiple continuous sub time buckets as a motion distance of the terminal in the target time bucket, and
determining the motion speed of the terminal in the target time bucket according to the target time bucket and the motion distance of the terminal in the target time bucket.

4. The method of claim 1, wherein the action pattern model comprises an action pattern matrix;
different columns of the action pattern matrix represent different degree intervals of deviation of the terminal from a horizontal plane, different rows represent different motion speed intervals of the terminal, and an element of the action pattern matrix represents an action pattern determined by both a motion speed interval corresponding to a row where the element is located and a degree interval, corresponding to a column where the element is located, of deviation from the horizontal plane, or
different rows of the action pattern matrix represent different degree intervals of deviation of the terminal from a horizontal plane, different columns represent different motion speed intervals of the terminal, and an element of the action pattern matrix represents an action pattern determined by both a motion speed interval corresponding to a column where the element is located and a degree interval, corresponding to a row where the element is located, of deviation from the horizontal plane; and
the determining the action pattern of the terminal by matching the motion action parameter of the terminal with the action pattern model that is constructed in advance comprises:
matching the motion action parameter of the terminal with the action pattern model that is constructed in advance, and
determining an action pattern corresponding to a matched element of the action pattern matrix as the action pattern of the terminal.

5. The method of claim 1, further comprising:
sending, in a preset prompting manner, prompting information to the terminal and/or any other terminal that establishes a wireless communication connection with the AP, wherein the prompting information is used for indicating the action pattern of the terminal.

6. A device configured to sense a terminal action, comprising:
a processor; and
a memory configured to store an instruction executable by the processor,
wherein the processor is configured to execute steps of:
acquiring location information of a terminal that has a wireless communication connection with an Access Point (AP);
determining a motion action parameter of the terminal according to the location information of the terminal; and
determining an action pattern of the terminal by matching the motion action parameter of the terminal with an action pattern model that is constructed in advance;
wherein the processor is further configured to execute steps of:
acquiring a first space coordinate of the terminal at a starting moment of a target time bucket and a second space coordinate at an ending moment of the target time bucket, wherein the first space coordinate and the second space coordinate are space coordinates of the terminal in a three-dimensional coordinate system established by taking a preset location as an origin; and
determining the motion action parameter of the terminal according to the first space coordinate and the second space coordinate;
wherein the motion action parameter comprises a degree of deviation of the terminal from a horizontal plane; the processor is further configured to execute steps of:
determining a positive or negative direction of deviation of the terminal from the horizontal plane according to a numerical relationship between a first z coordinate in the first space coordinate and a second z coordinate in the second space coordinate, and
determining an included angle between a motion path of the terminal and the horizontal plane according to the first space coordinate and the second space coordinate.

7. The device of claim 6, wherein the motion action parameter comprises a motion speed of the terminal;
the processor is further configured to execute steps of:
determining a linear space distance between the first space coordinate and the second space coordinate, and
determining the motion speed of the terminal in the target time bucket based on the linear space distance and the target time bucket.

8. The device of claim 6, wherein the motion action parameter comprises a motion speed of the terminal;
the processor is further configured to execute steps of:
dividing a target time bucket into multiple continuous sub time buckets; and
for a sub time bucket among the multiple continuous sub time buckets, acquiring a third space coordinate of the terminal at a starting moment of the sub time bucket and a fourth space coordinate at an ending moment of the sub time bucket, wherein the third space coordinate and the fourth space coordinate are space coordinates of the terminal in a three-dimensional coordinate system established by taking a preset location as an origin; and
the processor is further configured to execute steps of:
for a sub time bucket among the multiple continuous sub time buckets, determining a linear space distance between the third space coordinate and fourth space coordinate corresponding to the sub time bucket,
determining a sum of the linear space distances corresponding to the multiple continuous sub time buckets as a motion distance of the terminal in the target time bucket, and
determining the motion speed of the terminal in the target time bucket according to the target time bucket and the motion distance of the terminal in the target time bucket.

9. The device of claim 6, wherein the action pattern model comprises an action pattern matrix;
  different columns of the action pattern matrix represent different degree intervals of deviation of the terminal from a horizontal plane, different rows represent different motion speed intervals of the terminal, and an element of the action pattern matrix represents an action pattern determined by both a motion speed interval corresponding to a row where the element is located and a degree interval, corresponding to a column where the element is located, of deviation from the horizontal plane, or
  different rows of the action pattern matrix represent different degree intervals of deviation of the terminal from a horizontal plane, different columns represent different motion speed intervals of the terminal, and an element of the action pattern matrix represents an action pattern determined by both a motion speed interval corresponding to a column where the element is located and a degree interval, corresponding to a row where the element is located, of deviation from the horizontal plane; and
  the processor is further configured to execute steps of:
    matching the motion action parameter of the terminal with the action pattern model that is constructed in advance, and
    determining an action pattern corresponding to a matched element of the action pattern matrix as the action pattern of the terminal.

10. The device of claim 6, wherein the processor is further configured to execute a step of:
  sending, in a preset prompting manner, prompting information to the terminal and/or any other terminal that establishes a wireless communication connection with the AP, wherein the prompting information is used for indicating the action pattern of the terminal.

11. A non-transitory computer-readable storage medium having instructions stored thereon for execution by a processor of a terminal to enable the terminal to implement a method for sensing a terminal action, comprising:
  acquiring location information of a terminal that has a wireless communication connection with an Access Point (AP);
  determining a motion action parameter of the terminal according to the location information of the terminal; and
  determining an action pattern of the terminal by matching the motion action parameter of the terminal with an action pattern model that is constructed in advance; wherein
    the action pattern model comprises an action pattern matrix;
    different columns of the action pattern matrix represent different degree intervals of deviation of the terminal from a horizontal plane, different rows represent different motion speed intervals of the terminal, and an element of the action pattern matrix represents an action pattern determined by both a motion speed interval corresponding to a row where the element is located and a degree interval, corresponding to a column where the element is located, of deviation from the horizontal plane, or
    different rows of the action pattern matrix represent different degree intervals of deviation of the terminal from a horizontal plane, different columns represent different motion speed intervals of the terminal, and an element of the action pattern matrix represents an action pattern determined by both a motion speed interval corresponding to a column where the element is located and a degree interval, corresponding to a row where the element is located, of deviation from the horizontal plane; and
  the processor further executes the instructions to enable the terminal to implement operations of:
    matching the motion action parameter of the terminal with the action pattern model that is constructed in advance, and
    determining an action pattern corresponding to a matched element of the action pattern matrix as the action pattern of the terminal.

12. The non-transitory computer-readable storage medium of claim 11, wherein the processor further executes the instructions to enable the terminal to implement operations of:
  acquiring a first space coordinate of the terminal at a starting moment of a target time bucket and a second space coordinate at an ending moment of the target time bucket, wherein the first space coordinate and the second space coordinate are space coordinates of the terminal in a three-dimensional coordinate system established by taking a preset location as an origin; and
  determining the motion action parameter of the terminal according to the first space coordinate and the second space coordinate.

13. The non-transitory computer-readable storage medium of claim 12, wherein the motion action parameter comprises a motion speed of the terminal; and
  the processor further executes the instructions to enable the terminal to implement operations of:
    determining a linear space distance between the first space coordinate and the second space coordinate, and
    determining the motion speed of the terminal in the target time bucket based on the linear space distance and the target time bucket.

14. The non-transitory computer-readable storage medium of claim 11, wherein the motion action parameter comprises a motion speed of the terminal;
  the processor further executes the instructions to enable the terminal to implement operations of:
    dividing a target time bucket into multiple continuous sub time buckets;
    for a sub time bucket among the multiple continuous sub time buckets, acquiring a third space coordinate of the terminal at a starting moment of the sub time bucket and a fourth space coordinate at an ending moment of the sub time bucket, wherein the third space coordinate and the fourth space coordinate are space coordinates of the terminal in a three-dimensional coordinate system established by taking a preset location as an origin;
    for a sub time bucket among the multiple continuous sub time buckets, determining a linear space distance between the third space coordinate and fourth space coordinate corresponding to the sub time bucket,
    determining a sum of the linear space distances corresponding to the multiple continuous sub time buckets as a motion distance of the terminal in the target time bucket, and
    determining the motion speed of the terminal in the target time bucket according to the target time bucket and the motion distance of the terminal in the target time bucket.

15. The non-transitory computer-readable storage medium of claim 12, wherein the motion action parameter comprises a degree of deviation of the terminal from a horizontal plane; and the processor further executes the instructions to enable the terminal to implement operations of:
determining a positive or negative direction of deviation of the terminal from the horizontal plane according to a numerical relationship between a first z coordinate in the first space coordinate and a second z coordinate in the second space coordinate, and
determining an included angle between a motion path of the terminal and the horizontal plane according to the first space coordinate and the second space coordinate.

* * * * *